United States Patent [19]

Suzuki et al.

[11] Patent Number: 4,882,653

[45] Date of Patent: Nov. 21, 1989

[54] CAPACITOR

[75] Inventors: Motoyuki Suzuki, Kyoto; Yukichi Deguchi, Otsu, both of Japan

[73] Assignee: Toray Industries, Tokyo, Japan

[21] Appl. No.: 312,004

[22] Filed: Feb. 16, 1989

[30] Foreign Application Priority Data

Feb. 18, 1988 [JP] Japan .................................. 63-36374

[51] Int. Cl.$^4$ ............................................. H01G 4/08
[52] U.S. Cl. ................................................. 361/323
[58] Field of Search ...................... 29/25, 42; 361/323

[56] References Cited

U.S. PATENT DOCUMENTS

| | | | |
|---|---|---|---|
| 3,851,363 | 12/1974 | Booe | 361/323 X |
| 4,672,506 | 6/1987 | Deguchi et al. | 361/323 |
| 4,771,362 | 9/1988 | Behn | 361/323 X |

*Primary Examiner*—Donald Griffin
*Attorney, Agent, or Firm*—Austin R. Miller

[57] ABSTRACT

An aluminum-metallized polyphenylenesulfide film capacitor. The polyphenylenesulfide film serves as at least a portion of dielectric material. The ratio of S/Al at the surface of the aluminum electrode which is determined by X-ray photoelectron spectroscopy method is not more than 0.14, or the ratio of Cl/Al at the surface of the aluminum electrode is not more than 0.013.

7 Claims, No Drawings

CAPACITOR

BACKGROUND OF THE INVENTION

This invention relates to a capacitor. More particularly, this invention relates to a capacitor having polyphenylenesulfide (hereinafter referred to as PPS for short) film as at least a portion of the dielectric material of the capacitor.

I. Description of the Related Art

PPS film is disclosed, for example, in U.S. Pat. No. 4,286,018 and is known to have excellent properties as dielectric material of a capacitor. For example, a capacitor having PPS film as the dielectric material, which has excellent heat resistance, frequency characteristics and temperature characteristics, is disclosed in U.S. Pat. No. 4,672,506. In the conventional PPS film capacitor, aluminum thin layer is often formed on the PPS film by vapor deposition method and serves as an electrode.

However, the conventional aluminum-metallized PPS film capacitors have the drawbacks in, for example, that they have poor humidity resistance. That is, if the capacitor is used under high temperature and high humidity, the aluminum electrode rapidly fades away. As a result, the capacitance of the capacitor is decreased and the dielectric loss is largely increased.

To overcome this problem, a capacitor having PPS dielectric film with a specific surface roughness is proposed in Japanese Patent Disclosure (Kokai) No. 203315/87. Also proposed is a capacitor having PPS dielectric film with a specific surface tension so as to improve the adhesion between the PPS film and the aluminum electrode deposited thereon, which is disclosed in Japanese Patent Disclosure (Kokai) No. 226612/87.

However, even in these capacitors, the humidity resistance is not satisfactorily improved, and even if the capacitor is enclosed in an encapsulation in order to shut out the humidity, the humidity resistance may not be improved Further, in the conventional capacitors in which the adhesion between the PPS film and the deposited aluminum thin layer electrode is enhanced, or the intimacy among the PPS film layers of the wound or stacked PPS film(s) is enhanced, satisfactory humidity resistance is not obtained.

SUMMARY OF THE INVENTION

Accordingly, the object of the present invention is to provide a capacitor having an aluminum thin layer as an electrode and PPS film as at least a portion of the dielectric material, which has an excellent humidity resistance without degrading the excellent properties brought about by the PPS film such as excellent heat resistance, frequency characteristics and temperature characteristics.

The present inventors have intensively studied to find that if the ratio of the number of atoms of sulfur to the number of atoms of aluminum (hereinafter referred to as "the ratio of S/Al") at the surface of the deposited aluminum thin layer, which is determined by X-ray photoelectron spectroscopy method, is not more than 0.14, and/or the ratio of the number of atoms of chlorine to the number of atoms of aluminum (hereinafter referred to as "the ratio of Cl/Al") at the surface of the aluminum thin layer electrode is not more than 0.013, the aluminum electrode hardly fades away so that the humidity resistance is improved to complete the present invention.

That is, the present invention provides a capacitor comprising an aluminum thin layer as an electrode and a PPS film as at least a portion of dielectric material, in which the ratio of S/Al at the surface of the aluminum electrode is not more than 0.14.

The present invention further provides a capacitor comprising an aluminum thin layer as an electrode and a PPS film as at least a portion of dielectric material, in which the ratio of Cl/Al at the surface of the aluminum electrode is not more than 0.013.

The capacitor of the present invention has an excellent humidity resistance. That is, even if the capacitor is used under high temperature and and high humidity, the deposited aluminum thin layer electrode hardly fades away. Further, the capacitor of the present invention also has excellent properties brought about by the PPS film such as excellent heat resistance, frequency characteristics and temperature characteristics. The capacitor of the present invention has an excellent humidity resistance even if it is not enclosed in an encapsulation which is indispensable to the conventional polyethylene terephthalate film capacitor for preventing the invasion of moisture Therefore, by employing the capacitor of the present invention, the encapsulation may be omitted or simplified, so that the capacitor can be made smaller.

DETAILED DESCRIPTION OF THE PREFERRED EMBODIMENTS

As described above, the capacitor of the present invention includes PPS film as at least a portion of the dielectric material of the capacitor. The term "PPS film" herein means a biaxially oriented film of a resin composition containing PPS as the major component. The term "resin composition containing PPS as the major component" herein means a resin composition containing PPS in the amount of not less than 70% by weight. If the content of the PPS is less than 70% by weight, the excellent heat resistance, frequency characteristics and the temperature characteristics brought about by the PPS may be degraded. Further, the term "polyphenylenesulfide" (PPS) means a polymer containing

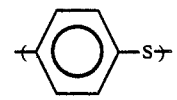

repeating unit (hereinafter referred to as p-phenylenesulfide repeating unit) in the amount of not less than 70 mol % in total of the repeating units. The content of the p-phenylenesulfide repeating unit is preferably not less than 85%. If the content of the p-phenylenesulfide repeating unit is less than 70 mol %, the crystallinity of the polymer and the thermal transition point are lowered, so that the excellent heat resistance, dimensional stability and mechanical properties which are the characteristic feature of the PPS film may be degraded. The PPS preferably has a melt viscosity of 500–15,000 poise at 300° C. under a shear rate of 200 sec$^{-1}$. The thickness of the PPS film is preferably 0.2–25 μm. The average surface roughness Ra of the PPS film is preferably 0.02–0.15 μm in view of the ease of handling of the film, ease of forming of the capacitor element and the adhesion between the film and the deposited aluminum thin layer.

The PPS dielectric film is wound or stacked to form a well-known wound capacitor or a stacked capacitor. In a typical mode of the present invention, a surface of the PPS film is metallized with aluminum serving as the electrode and another surface is remained non-metallized. The PPS film(s) having only one metallized surface is (are) wound or stacked to form a wound or stacked capacitor. In another typical mode of the present invention, the PPS film having two metallized surfaces is wound or stacked with another PPS film having no metallized surface to form a wound or stacked capacitor. In the capacitor of the present invention, a PPS film must be contained as a dielectrics, but another dielectrics may be co-employed with the PPS as long as it does not degrade the characteristics of the PPS film capacitor. Examples of the materials of the other dielectrics which may be used along with the PPS film in the present invention may include polyesters, polyolefins, polycarbonates, polyphenylene oxides, polysulfones, polyethersulfones, polyether imides and polyetherether ketones.

The aluminum thin layer serving as the electrode is a non-self-supporting aluminum thin layer formed by vacuum vapor deposition method, sputtering method or plating method and so on. In this invention, these methods are called "metallizing". The term "aluminum" means aluminum or a composition or alloy containing aluminum as the major constituent. Other metals such as Ni and Cr, organic or inorganic materials may be contained in the aluminum thin layer for the purpose of, for example, improving the adhesion between the aluminum and the film or improving the humidity resistance or the other characteristics. The thickness of the aluminum thin layer electrode may preferably be 1–10Ω in terms of the surface resistance after formation of the thin layer.

In the conventional capacitors, the surface of the aluminum thin layer may be contaminated with a sulfur-containing component and/or a chlorine-containing component originated from the PPS film. It was surprisingly discovered by the present inventors that if the ratio of S/Al or the ratio of Cl/Al at the surface of the aluminum thin layer electrode is smaller than a specific value, the fading away of the aluminum thin layer under high temperature and high humidity may be substantially prevented. Thus, in the capacitor of the present invention, the ratio of S/Al at the surface of the aluminum thin layer electrode is not more than 0.14. Alternatively, in the capacitor of the present invention, the ratio of Cl/Al at the surface of the aluminum thin layer electrode is not more than 0.013. Although the excellent humidity resistance may be obtained if one of the S/Al ratio and the Cl/Al ratio meets the above-mentioned requirement, in the especially preferred mode of the present invention, the S/Al ratio at the surface of the aluminum thin layer electrode is not more than 0.14 and the Cl/Al ratio at the surface of the aluminum thin layer electrode is not more than 0.013. The ratios are determined by X-ray photoelectron spectroscopy method as described in detail in the Examples hereinbelow described.

In the preferred mode of the present invention, to attain such a low S/Al ratio and/or low Cl/Al ratio, a barrier layer may be formed on the non-metallized surface or surfaces of the PPS film(s) so as to prevent the bleeding of the sulfur-containing component or the chlorine-containing component from the PPS film. Any material which can prevent the bleeding of the sulfur- or chlorine-containing material may be employed for forming the barrier layer as long as it does not adversely degrade the properties of the PPS film capacitor. Examples of such a material may include organic materials such as paraffin and oils. Preferably, the boiling point of the material of the barrier layer is not lower than 260° C. The thickness of the barrier layer may preferably be 0.001–0.5 μm, more preferably 0.001–0.1 μm.

In another mode of the present invention, PPS which gives only a small amount of extract when extracted with an organic solvent is used for constituting the PPS film dielectric. In this case, the amount of the xylene extract is not more than 2.0% by weight, preferably not more than 1.2% by weight. By employing such a PPS, the ratio of S/Al or Cl/Al defined in the present invention may be attained.

Such a PPS film may be obtained by extracting or washing the PPS film, PPS powder or PPS resin composition with a polar solvent. Examples of the polar solvent may include, for example, xylene, diphenyl ether and chloroform.

The above-described barrier layer may also be employed in this mode of the invention.

The capacitor of the present invention may be, for example, manufactured as follows:

The PPS for forming the PPS film may be produced by a method well-known in the art. In producing the PPS, it is preferred to remove low molecular components by, for example, extracting the polymer with diphenylether or the like to reduce the contamination of the aluminum electrode with the sulfur- or chlorine-containing components.

The PPS is then formed into a film by, for example, extrusion method and is then biaxially streached. The preparation of biaxially oriented PPS film is well-known in the art. When the PPS film is metallized, well-known conventional method such as vacuum vapor deposition method, sputtering method or plating method can be employed. In this case, the surface on which the aluminum thin layer is deposited preferably has a surface tension of not less than 40 dyn/cm, preferably not less than 50 dyn/cm. Further, to promote the adhesion of the aluminum thin layer and the film surface, the film surface may preferably be subjected to corona treatment or plasma treatment.

When the barrier layer is formed on the non-metallized surface of the PPS film, the barrier layer is formed by, for example, coating the organic material constituting the barrier layer or a solution thereof.

Then the metallized PPS film is wound or stacked in the conventional manner to form a wound capacitor or stacked capacitor.

Thereafter, if desired, the wound or stacked body may be heat-pressed in the conventional manner to shape the capacitor element. In view of the shaping effect of the heat-press and of reducing the amount of the impurities bled from the PPS film, the temperature in the heat-press step may preferably be 100°–260° C., more preferably 150°–240° C. The pressure of the heat-press may usually be 10–1000 kg/cm$^2$.

Outer electrodes may be provided to the capacitor in the conventional manner. Further, lead wires may be connected to the outer electrodes. Alternatively, the capacitor of the present invention may be in the form of a so called chip capacitor which does not have a lead wire, which is suited for surface mounting.

If desired, the capacitor element thus produced may be enclosed in a conventional encapsulation. Examples of the encapsulation include those made of an epoxy resin which are produced by the conventional molding method or dipping method, and those made of PPS resin which are produced by the conventional casing method or injection molding method. It should be noted, however, as mentioned above, the capacitor of the present invention has satisfactory humidity resistance even without the encapsulation.

The method of determining characteristics concerning the present invention and method of the evaluation of humidity resistance employed in the Examples hereinafter described will now be described.

(1) Quantification of sulfur-containing component and chlorine-containing component by X-ray photoelectron spectroscopy The capacitor was broken down so as to expose the surface of the aluminum thin layer serving as the electrode. The surface of the aluminum thin layer was analyzed by X-ray photoelectron spectroscopy (also called as ESCA or XPS). The measured integrated intensities of $Al_{2p}$, $S_{2p}$ and $Clhd 2p$ are compensated by the detection sensitivity to determine the ratio of Al/S/Cl and the ratios of S/Al and Cl/Al were calculated therefrom. The conditions of the X-ray photoelectron spectroscopy were as follows:

Apparatus: ES-200 type manufactured by Kokusai Denki Co., Ltd.
Excitation X-ray: Al K α ray (1486.6 eV)
X-ray power: 10 kV, 20 mA
Temperature: 20° C.
Vacuum: $3 \times 10^{-8}$ torr (2) Capacitance of Capacitor The capacitance was measured by using an automatic capacitance bridge.

(3) Evaluation of Humidity Resistance

The capacitor was aged at 60° C., 95%RH for 1000 hours and the change of the capacitance was measured. The ratio of the change of the capacitance to the capacitance before the aging operation ΔC/C (wherein ΔC represents the change of the capacitance and C represent the capacitance before the aging operation) was calculated and this value was employed as the index of humidity resistance. The smaller the absolute value of ΔC/C, the better the humidity resistance.

(4) Surface Roughness Ra

Surface roughness is measured in accordance with JIS R-0601.

(5) Surface Tension

Surface tension is measured in accordance with JIS K-6768 (1971).

(6) Amount of Xylene-extracted Components of PPS Film

PPS film is extracted with xylene using Soxhlet's extractor. The temperature of the lower flask is 200° C. and the extraction is continued for 36 hours. The obtained extract in xylene is evaporated to dryness and the residue is weighed. The weight of the obtained residue is divided by the weight of the film and the quotient expressed in terms of percentage is referred to as the amount of xylene extract.

The present invention will now be described by way of examples thereof. It should be understood that the examples are presented for illustration purpose only and should not be interpreted any restrictive way.

EXAMPLE 1

(1) PPS Film

One surface of a biaxially oriented PPS film (commercially available from Toray Industries, Inc., Tokyo, Japan, under the tradename of "Torelina") with a nominal thickness of 2.5 μm was subjected to corona treatment with an electric energy density of 1800 Joule per 1 m².

(2) Metallization

On portions of the surface of the PPS film, which was subjected to the corona treatment, aluminum was vacuum vapor-deposited to a thickness to attain a surface resistance of 2Ω, such that the aluminum-deposited portions form stripes along the machine direction of the PPS film. That is, the aluminum-deposited portions and the non-aluminum-deposited portions (hereinafter referred to as "margin portions") are alternately arranged so as to form stripes along the longitudinal direction of the PPS film. The width of the aluminum-deposited portions was 9.0 mm and that of the margin portions was 1.0 mm.

(3) Preparation of Capacitor Element

To the surface of the PPS film which was not metallized, paraffin solution in a petroleum solvent was uniformly applied and dried to form a paraffin layer with a theoretical thickness of 0.003 μm.

Then the PPS film was slitted along the longitudinal direction such that each of the aluminum-deposited portions and each of the margin portions were cut along the longitudinal center line thereof to prepare tapes with a aluminum-deposited portion of 4.5 mm in width and a margin portion of 0.5 mm in width at the left or right side of the tape. The tapes were wound.

A tape with a margin portion at the left side and a tape with a margin portion at the right side were stacked (and were wound together about a core cylinder to form a wound body with a capacitance of about 0.1 μF. The tapes were stacked such that the longitudinal left edge of the tape with a margin portion at the right side is protruded by 0.5 mm from the longitudinal left edge of the tape with a margin portion at the left side.

From the thus prepared wound body, the core cylinder was removed and the wound body was pressed at 180° C. with a pressure of 10 kg/cm² for 5 minutes. To the both edge faces of the pressed wound body, metal was sprayed to form outer electrodes, and a lead wire was welded to the each electrode to obtain a capacitor element. This capacitor element was designated as capacitor A-1.

The humidity resistance of the capacitor A-1 was evaluated. The result is shown in the table below. Further, the capacitor A-1 was broken down and the sulfur-containing component and chlrorine-containing component at the surface of the aluminum-deposited portion were quantified. The ratio of S/Al and Cl/Al are shown in the table below.

The capacitor A-1 was dipped in epoxy resin to prepare a capacitor with an encapsulation made of epoxy resin. This capacitor was designated as capacitor A-2.

The humidity resistance, as well as the S/Al and Cl/Al ratios at the surface of the aluminum layer were determined. The results are shown in the table below.

As can be seen from the table, the humidity resistance of the capacitors A-1 and A-2 of the present invention was excellent irrespective of the existence of the encapsulation.

EXAMPLE 2

The same operation as in Example 1 was repeated except that the wound body was pressed at 240° C. with a pressure of 30 kg/cm$^2$. The capacitor which did not have an encapsulation was designated as capacitor B-1 and the capacitor with an epoxy encapsulation was designated as capacitor B-2. The humidity resistance, and the ratios of S/Al and Cl/Al are shown in the table below.

As can be seen from the table, the humidity resistance of the capacitors B-1 and B-2 of the present invention was excellent irrespective of the existence of the encapsulation.

EXAMPLE 3

The same operation as in Example 1 was repeated except that the thickness of the paraffin layer was 0.002 μm and the wound body was pressed at 260° C. with a pressure of 30 kg/cm$^2$ for one minute. The capacitor which did not have an encapsulation was designated as capacitor C-1 and the capacitor with an epoxy encapsulation was designated as capacitor C-2. The humidity resistance, and the ratios of S/Al and Cl/Al are shown in the table below.

As can be seen from the table, the humidity resistance of the capacitors C-1 and C-2 of the present invention was good irrespective of the existence of the encapsulation.

EXAMPLE 4

The same operation as in Example 1 was repeated except that the thickness of the paraffin layer was 0.002 μm and the wound body was pressed for 60 minutes. The capacitor which did not have an encapsulation was designated as capacitor D-1 and the capacitor with an epoxy encapsulation was designated as capacitor D-2. The humidity resistance, and the ratios of S/Al and Cl/Al are shown in the table below.

As can be seen from the table, the humidity resistance of the capacitors D1 and D-2 of the present invention was good irrespective of the existence of the encapsulation.

COMPARATIVE EXAMPLE 1

The same operation as in Example 1 was repeated except that the paraffin layer was not formed. The capacitor which did not have an encapsulation was designated as capacitor E-1 and the capacitor with an epoxy encapsulation was designated as capacitor E-2. The humidity resistance, and the ratios of S/Al and Cl/Al are shown in the table below.

As can be seen from the table, since the paraffin layer was not formed and so the S/Al ratio and Cl/Al ratio are outside of the range defined in the present invention, the humidity resistance of these capacitors was not good.

COMPARATIVE EXAMPLE 2

The same operation as in Example 2 was repeated except that the paraffin layer was not formed. The capacitor which did not have an encapsulation was named capacitor F-1 and the capacitor with an epoxy encapsulation was named capacitor F-2. The humidity resistance, and the ratios of S/Al and Cl/Al are shown in the table below.

As can be seen from the table, since the paraffin layer was not formed and so the S/Al ratio and Cl/Al ratio are outside of the range defined in the present invention, the humidity resistance of these capacitors was bad.

COMPARATIVE EXAMPLE 3

The same procedure as in Example 1 was repeated except that the dielectric film was a biaxially oriented polyester film (commercially available from Toray Industries, Inc. under a tradename of "Lumirror") with a nominal thickness of 2.5 μm and the wound body was pressed at 130° C. with a pressure of 30 kg/cm$^2$ for 5 minutes. The capacitor which did not have an encapsulation was designated as capacitor G-1 and the capacitor with an epoxy encapsulation was designated as capacitor G-2. The humidity resistance, and the ratios of S/Al and Cl/Al are shown in the table below.

As can be seen from the table, since the dielectric film is a polyester film, irrespective of the S/Al and Cl/Al ratios, the capacitor without the encapsulation has very poor humidity resistance. Further, the excellent characteristics such as heat resistance, frequency characteristics and temperature characteristics which are brought about by using PPS film as the dielectric film may not be obtained.

COMPARATIVE EXAMPLE 4

The same procedure as in Comparative Example 1 was repeated except that the dielectric film was a biaxially oriented polyester film (commercially available from Toray Industries, Inc. under a tradename of "Lumirror") with a nominal thickness of 2.5 μm and the wound body was pressed at 130° C. with a pressure of 30 kg/cm$^2$. The capacitor which did not have an encapsulation was designated as capacitor H-1 and the capacitor with an epoxy encapsulation was designated as capacitor H-2. The humidity resistance, and the ratios of S/Al and Cl/Al are shown in the table below.

As can be seen from the table, since the dielectric film is a polyester film, irrespective of the S/Al and Cl/Al ratios, the capacitor without the encapsulation has very poor humidity resistance. It can also be seen from the results of Comparative Examples 3 and 4 that the forming the paraffin film substantially does not give influence on the humidity life if the dielectric film is a polyester film.

TABLE

| Example | Capacitor | S/Al | Cl/Al | Humidity Resistance (ΔC/C) (%) |
|---|---|---|---|---|
| Example 1 | A-1 | 0.053 | 0.007 | 0.0 |
|  | A-2 | 0.056 | 0.008 | 0.0 |
| Example 2 | B-1 | 0.113 | 0.007 | 0.0 |
|  | B-2 | 0.121 | 0.008 | 0.0 |
| Example 3 | C-1 | 0.148 | 0.011 | −0.4 |
|  | C-2 | 0.150 | 0.011 | −0.4 |
| Example 4 | D-1 | 0.133 | 0.014 | −0.6 |
|  | D-2 | 0.135 | 0.015 | −0.7 |
| Comparative Example 1 | E-1 | 0.178 | 0.018 | −8.9 |
|  | E-2 | 0.185 | 0.020 | −10.2 |
| Comparative Example 2 | F-1 | 0.202 | 0.026 | −29.7 |
|  | F-2 | 0.220 | 0.029 | −32.5 |
| Comparative Example 3 | G-1 | 0.000 | 0.000 | −89.4 |
|  | G-2 | 0.000 | 0.000 | −0.5 |
| Comparative | H-1 | 0.000 | 0.000 | −90.2 |

TABLE-continued

| Example | Capacitor | S/Al | Cl/Al | Humidity Resistance (ΔC/C) (%) |
|---|---|---|---|---|
| Example 4 | H-2 | 0.000 | 0.000 | −0.7 |

We claim:

1. A capacitor comprising an aluminum thin layer as an electrode and a polyphenylene sulfide film as at least a portion of dielectric material, in which the ratio of the number of atoms of sulfur to the number of atoms of aluminum at the surface of the aluminum thin layer is not more than 0.14.

2. The capacitor of claim 1, wherein the polyphenylene sulfide film has a non-metallized surface and a barrier layer is formed on the non-metallized surface.

3. The capacitor of claim 1 or 2, wherein the ratio of the number of atoms of chlorine to the number of atoms of aluminum at the surface of the aluminum electrode is not more than 0.013.

4. A capacitor comprising an aluminum thin layer as an electrode and a polyphenylene sulfide film as at least a portion of dielectric material, in which the ratio of the number of atoms of chlorine to the number of atoms of aluminum at the surface of the aluminum electrode is not more than 0.013.

5. The capacitor of claim 4 wherein the polyphenylene sulfide film has a non-metallized surface and a barrier layer is formed on the non-metallized surface.

6. The capacitor of claim 2 or 5, wherein the barrier layer has a thickness of 0.001–0.5 μm.

7. The capacitor of any one of claims 1–3, wherein the amount of the extract from the polyphenylene sulfide film by xylene is not more than 2.0% by weight.

* * * * *

UNITED STATES PATENT AND TRADEMARK OFFICE
CERTIFICATE OF CORRECTION

PATENT NO. : 4,882,653

DATED : Nov. 21, 1989

INVENTOR(S) : Motoyuki Susuki, Yukichi Deguchi

It is certified that error appears in the above-identified patent and that said Letters Patent is hereby corrected as shown below:

Claim 7, line 1, change "1-3" to --1-5--.

Signed and Sealed this

Twenty-third Day of April, 1991

Attest:

Attesting Officer

HARRY F. MANBECK, JR.

Commissioner of Patents and Trademarks